United States Patent
Saez et al.

(10) Patent No.: US 10,899,012 B2
(45) Date of Patent: Jan. 26, 2021

(54) COORDINATED ROBOT TO ROBOT COMPONENT ASSEMBLY

(71) Applicant: GM Global Technology Operations LLC, Detroit, MI (US)

(72) Inventors: Miguel A. Saez, Clarkston, MI (US); John P. Spicer, Plymouth, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 27 days.

(21) Appl. No.: 16/277,350

(22) Filed: Feb. 15, 2019

(65) Prior Publication Data

US 2020/0262079 A1    Aug. 20, 2020

(51) Int. Cl.
| | |
|---|---|
| *B25J 9/16* | (2006.01) |
| *B25J 13/08* | (2006.01) |
| *B25J 19/02* | (2006.01) |
| *B25J 15/00* | (2006.01) |

(52) U.S. Cl.
CPC ........ *B25J 9/1687* (2013.01); *B25J 9/1628* (2013.01); *B25J 9/1697* (2013.01); *B25J 13/085* (2013.01); *B25J 15/0019* (2013.01); *B25J 19/023* (2013.01); *G05B 2219/40306* (2013.01); *G05B 2219/45104* (2013.01)

(58) Field of Classification Search
None
See application file for complete search history.

(56) References Cited

U.S. PATENT DOCUMENTS

| | | | | | |
|---|---|---|---|---|---|
| 5,572,102 | A | * | 11/1996 | Goodfellow | B25J 9/1697 219/124.1 |
| 2013/0010081 | A1 | * | 1/2013 | Tenney | G06T 7/80 348/47 |
| 2016/0291571 | A1 | * | 10/2016 | Cristiano | B25J 9/1697 |
| 2020/0130189 | A1 | * | 4/2020 | Ghanem | G05B 19/41875 |

FOREIGN PATENT DOCUMENTS

| | | |
|---|---|---|
| DE | 102004021388 A1 | 12/2005 |
| DE | 102004049332 A1 | 4/2006 |
| DE | 102012112025 B4 | 6/2014 |
| DE | 102016114863 A1 | 2/2017 |
| DE | 102016116404 A1 | 3/2017 |
| EP | 2227356 B1 | 9/2010 |
| EP | 2824526 A2 | 1/2015 |

* cited by examiner

*Primary Examiner* — Ryan A Jarrett

(57) ABSTRACT

A method of assembling a secondary component to a primary component comprises grasping a primary component with a first end-of-arm tool, wherein the first end-of-arm tool is attached to a first robot arm and grasping a secondary component with a second end-of-arm tool, wherein the second end-of-arm tool is attached to a second robot arm. Moving the primary component to an interfacing position, wherein interfacing surfaces on the primary component are presented at a proper position and orientation for the secondary component to be attached thereto. Moving the second end-of-arm tool to bring the secondary component into engagement with the interface surfaces of the primary component, and forming a joint between the primary component and the secondary component with a joining tool attached to a joining robot arm.

20 Claims, 2 Drawing Sheets

COORDINATED ROBOT TO ROBOT COMPONENT ASSEMBLY

INTRODUCTION

The present disclosure relates to a fixtureless component assembly system and to a method of assembling a component.

A manufacturing system typically moves, transforms, or operates on parts, subassemblies, and/or assemblies that must be accurately located and held in place for manufacturing and assembly operations. For example, a sheet metal part or steel plate, subassembly, or assembly may need to be accurately located and held in place to conduct assembly, welding, and inspection operations in a vehicle assembly plant or along an assembly line for items such as appliances, aircraft, furniture, and electronics. Part locating fixtures are normally used for this purpose.

Part locating fixtures typically include a plurality of fixed pins that are configured to fit into a plurality of locating holes defined by a part, and one or more clamps that are configured to hold the part in place. Part locating fixtures are generally useable for only one particular part size and/or shape and usually need to be modified or rebuilt to locate and hold a differently sized and/or shaped part. Multiple part locating fixtures are typically required for the wide variety of parts and the wide variety of assembly and manufacturing operations in a manufacturing plant. Thus, while current systems achieve their intended purpose, there is a need for a new and improved system and method for assembling a component, and more particularly to assemble a component using a fixtureless component assembly system where the robots communicate between one another to determine the relative position of components to each other.

SUMMARY

According to several aspects of the present disclosure, a method of assembling a secondary component to a primary component comprises grasping a primary component with a first end-of-arm tool, wherein the first end-of-arm tool is attached to a first robot arm and grasping a secondary component with a second end-of-arm tool, wherein the second end-of-arm tool is attached to a second robot arm. Visually inspecting the primary component with a camera mounted on the second end-of-arm tool and locating at least one datum feature on the primary component. Comparing the location of the at least one datum feature of the primary component, as measured by the camera, to a reference coordinate frame stored in a second controller, wherein the second controller is adapted to control movements of the second robot arm and second end-of-arm tool. Calculating an off-set between the location of the at least one datum feature of the primary component, as measured by the camera, and the reference coordinate frame. Registering the off-set information in the second controller and sending the off-set information stored in the second controller to a first controller over a robot-to-robot communication architecture; wherein the first controller is adapted to control movements of the first robot arm and first end-of-arm tool. Creating a coordinate frame in the first controller based on the off-set information received from the second controller and moving the primary component to an interfacing position, wherein interfacing surfaces on the primary component are presented at a proper position and orientation for the secondary component to be attached thereto. Sending the created coordinate frame, including the position of the at least one datum feature after moving the primary component, from the first controller to the second controller, using the created coordinate frame and the position of the at least one datum feature to identify the location of the interface surface for the secondary component on the primary component relative to the at least one datum feature based on the created coordinate frame, and moving the second end-of-arm tool to bring the secondary component into engagement with the interface surfaces of the primary component.

According to another aspect of the present disclosure, the method further comprises forming a joint between the primary component and the secondary component with a joining tool attached to a joining robot arm.

According to another aspect of the present disclosure, wherein forming a joint between the primary component and the secondary component with a joining tool attached to a joining robot arm further comprises welding the secondary component to the primary component with a welding tool attached to the joining robot arm.

According to another aspect of the present disclosure, the method further comprises simultaneously with moving the second end-of-arm tool to bring the secondary component into engagement with the interface surfaces of the primary component, monitoring forces measured by a force gauge mounted on the second robot arm, wherein the force gauge is adapted to measure forces being placed onto the secondary component by the second robot arm and second end-of arm tool to determine when there is contact between the primary and secondary components and to measure the force that the secondary component is being held in contact with the primary component.

According to another aspect of the present disclosure, the method further comprises simultaneously with forming a joint between the primary component and the secondary component with a joining tool attached to a joining robot arm, continuously monitoring forces measured by the force gauge mounted on the second robot arm, and varying the position between the primary component and the secondary component to achieve a pre-determined force schedule.

According to another aspect of the present disclosure, the method further comprises simultaneously with forming a joint between the primary component and the secondary component with a joining tool attached to a joining robot arm, continuously monitoring forces measured by the force gauge mounted on the second robot arm to detect thermal distortion between the primary component and secondary component, and varying the position and force applied between the primary component and the secondary component in reaction to thermal distortion between the primary component and secondary component.

According to another aspect of the present disclosure, moving the primary component to an interfacing position, wherein interfacing surfaces on the primary component are presented at a proper position and orientation for the secondary component to be attached thereto further comprises moving the first robot arm and first end-of-arm tool, and simultaneously, moving the primary component with respect to the first end of arm tool, to move the primary component to an interfacing position, wherein interfacing surfaces on the primary component are presented at a proper position and orientation for the secondary component to be attached thereto.

According to another aspect of the present disclosure, moving the primary component with respect to the first end of arm tool, further comprises articulating a trunnion mounted on the first end-of-arm tool, wherein the trunnion supports the primary component within the first end-of-arm tool and is moveable with a single degree of freedom to rotate the primary component relative to the first end-of-arm tool.

According to another aspect of the present disclosure, visually inspecting the primary component further comprises visually inspecting the primary component with a camera mounted on the second end-of-arm tool.

According to another aspect of the present disclosure, visually inspecting the primary component further comprises visually inspecting the primary component with a camera mounted at a fixed location.

According to several aspects of the present disclosure, a component assembly system comprises a first end-of-arm tool mounted onto a first robot arm, wherein the first end-of-arm tool is adapted to grasp a primary component and a second end-of-arm tool mounted onto a second robot arm, wherein the second end-of-arm tool is adapted to grasp a secondary component. A non-contact inspection device is adapted to visually inspect the primary component and locate datum features on the primary component. A first controller is adapted to control movements of the first robot arm and a second controller is adapted to control movements of the second robot arm and to compare the location of the datum features of the primary component, as measured by the camera, to a reference coordinate frame stored in a the second controller, wherein the second controller is further adapted to calculate an off-set between the location of the datum features of the primary component, as measured by the camera, and the reference coordinate frame, and to register the off-set information in the second controller. A robot-to-robot communication architecture interconnects the first controller and the second controller, wherein the second controller sends the off-set information to the first controller over the robot-to-robot communication architecture, and the first controller is adapted to create a coordinate frame based on the off-set information received from the second controller and move the primary component to an interfacing position, wherein interfacing surfaces on the primary component are presented at a proper position and orientation for the secondary component to be attached thereto. A force gauge is mounted onto the second end-of-arm tool, wherein the force gauge is adapted to measure reaction forces in the interface surfaces when there is contact between the primary and secondary components.

According to another aspect of the present disclosure, the component assembly system further comprises a joining tool mounted onto a joining robot arm, wherein the joining tool is adapted to form a joint between the primary component and the secondary component.

According to another aspect of the present disclosure, the joining tool is a welding tool adapted to weld the secondary component to the primary component.

According to another aspect of the present disclosure, the second controller is adapted to vary the reaction force measured between the primary component and the secondary component based on a pre-determined force schedule.

According to another aspect of the present disclosure, the second controller is adapted to vary the reaction force measured between the primary component and the secondary component in reaction to thermal distortion between the primary component and secondary component.

According to another aspect of the present disclosure, the component assembly system further comprises a trunnion mounted on the first end-of-arm tool, the trunnion adapted to support the primary component on the first end-of-arm tool and rotatable about an axis to enable the primary component to rotate relative to the first end-of-arm tool.

According to another aspect of the present disclosure, the component assembly system further comprises an actuator mounted on the first end-of-arm tool adapted to rotate the trunnion relative to the first end-of-arm tool, and an encoder attached to the trunnion adapted to measure the angular position of the trunnion relative to the first end-of-arm tool, wherein the actuator and the encoder are in communication with the first controller and the first controller controls the rotation of the trunnion in conjunction with controlling movement of the first robot arm when moving the primary part to the interfacing position.

According to another aspect of the present disclosure, the non-contact inspection device is a camera mounted at a fixed position.

According to another aspect of the present disclosure, the non-contact inspection device is a camera mounted on the second end-of-arm tool.

According to another aspect of the present disclosure, the first and second robot arms are six-axis articulated robot arms.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
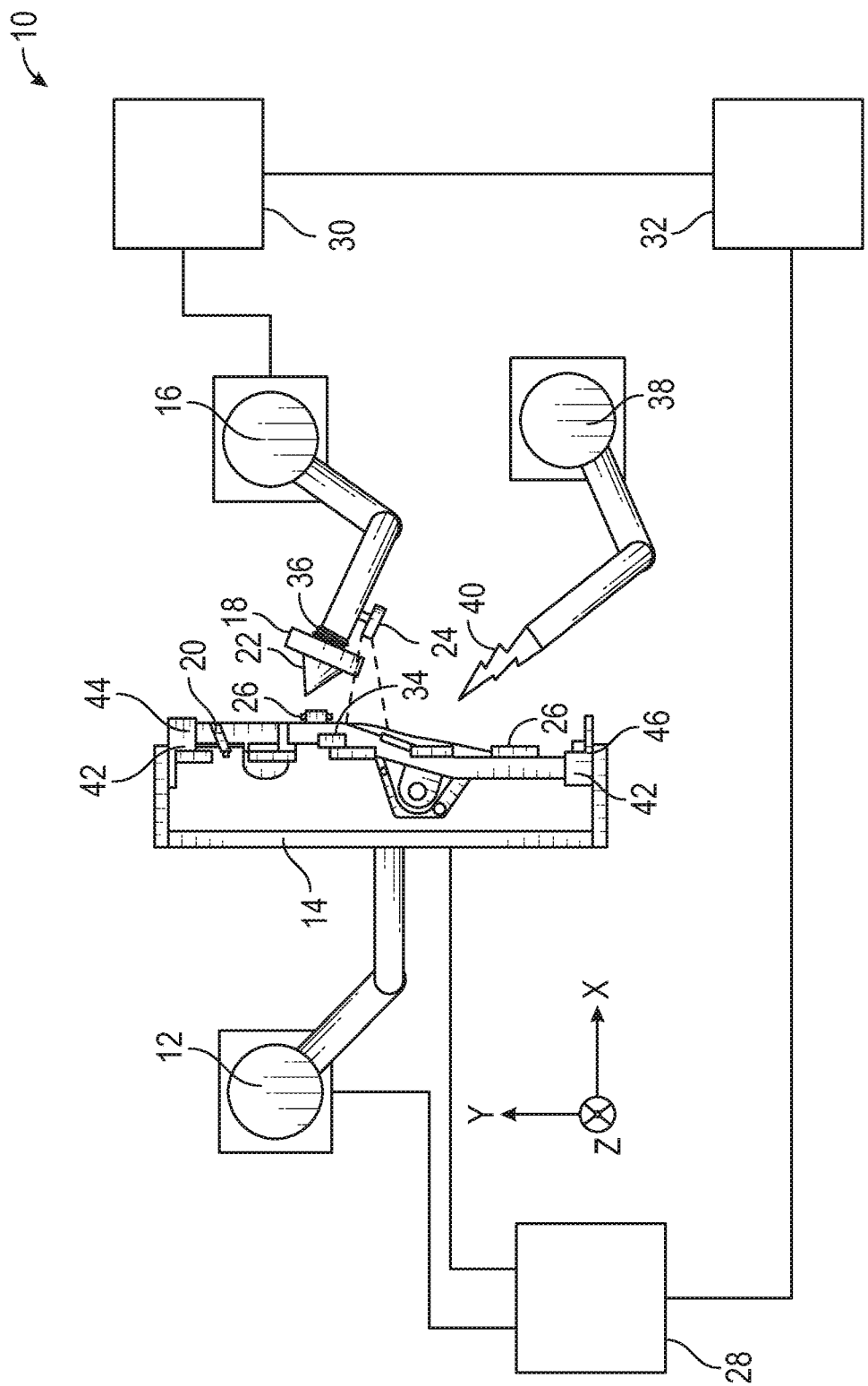
FIG. 1 is a perspective view of the component assembly system according to an exemplary embodiment.

Referring to FIG. 1, a component assembly system of the present disclosure is shown generally at 10. The component assembly system 10 comprises a first robot arm 12 with a first end-of-arm tool 14 mounted thereon, a second robot arm 16 with a second end-of-arm tool 18 mounted thereon. The first end-of-arm tool 14 is adapted to grasp a primary component 20 and hold the primary component 20 during the assembly process. The second end-of-arm tool 18 is adapted to grasp a secondary component 22 and hold the secondary component 22 during the assembly process.

The primary and secondary components 20, 22 may be, as a non-limiting example, a panel configured as a decklid or liftgate for an automotive vehicle. Alternatively, the primary and secondary components 20, 22 may be an aircraft fuselage panel, a door panel for a consumer appliance, an armrest for a chair, or any other subcomponent configured to be joined or attached to another subcomponent. The primary and secondary components 20, 22 may be formed from any suitable material, such as, metal, plastic, a composite, and the like. The primary and secondary components 20, 22 as shown in the exemplary embodiment of FIG. 1 are vehicle frame components for an automobile. More specifically, the primary component 20 is a vehicle frame and the secondary component 22 is a subcomponent such as a bracket that is attached to the primary component 20.

The first and second robot arms 12, 16 may be a programmable mechanical arm, may include hand, wrist, elbow, and shoulder portions (not shown), and may be remotely-controlled by pneumatics and/or electronics. The first and second robot arms 12, 16 may be, as non-limiting examples, a six-axis articulated robot arm, a Cartesian robot arm, a spherical or polar robot arm, a selective compliance assembly robot arm, and the like. In one non-limiting example, the first and second robot arms 12, 16 may be a six-axis articulated robot arm.

The component assembly system 10 includes a camera 24 mounted on the second robot arm 16. The camera 24 visually inspects the primary component 20 and locates datum features 26 on the primary component 20.

A first controller 28 is adapted to control movements of the first robot arm 12 and a second controller 30 is adapted to control movements of the second robot arm 16. The first and second system controllers 28, 30 are a non-generalized, electronic control devices having a preprogrammed digital computer or processor, memory or non-transitory computer readable medium used to store data such as control logic, software applications, instructions, computer code, data, lookup tables, etc., and a transceiver or input/output ports. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

The second controller 30 is further adapted to compare the location of the datum features 26 of the primary component 20, as measured by the camera 24, to a reference coordinate frame stored in the second controller 30. The coordinate frame is a virtual three-dimensional positional space within which the primary and secondary components 20, 22 are assembled. The reference coordinate frame provides three-dimensional location information for a reference position of the primary component 20 within the coordinate frame.

The inspection camera 24 communicates with the second controller 30. The second controller 30 uses information from the inspection camera 24 to determine the position of the primary component. The second controller 30 is also adapted to calculate an off-set between the location of the datum features 26 of the primary component 20, as measured by the camera 24, and the reference coordinate frame, and to store the off-set information in the second controller 30. The inspection camera 24 can be mounted at a fixed position, or alternatively, the inspection camera 24 may be mounted onto the second end-of-arm tool 18.

The first controller 28 moves the first robot arm 12 and actuates the first end-of-arm tool 14 to control the position of the primary component 20. The second controller 30 moves the second robot arm 16 and actuates the second end-of-arm tool 18 to control the position of the secondary component 22. Movement of the first and second robot arms 12, 16 by the first and second controllers 28, 30 is based on executable code stored in memory or provided to the controllers 28, 30. A robot-to-robot communication architecture 32 interconnects the first controller 28 and the second controller 30. The robot-to-robot communication architecture 32 allows the first and second robot arms 12, 16 to communicate with one another and share information that the first and second controllers 28, 30 use to coordinate movement of the primary and secondary components 20, 22. The second controller 30 sends the off-set information to the first controller 28 over the robot-to-robot communication architecture 32.

A trunnion 42 is mounted on the first end-of-arm tool 14. The trunnion 42 is adapted to support the primary component 20 on the first end-of-arm tool 14 and is rotatable about an axis to enable the primary component 20 to rotate relative to the first end-of-arm tool 14. An actuator 44 is mounted on the first end-of-arm tool 14. The actuator 44 rotates the trunnion 42, and the primary component 20 supported on the trunnion 42, relative to the first end-of-arm tool 14. An encoder 46 is attached to the trunnion 42 and measures the angular position of the trunnion 42 relative to the first end-of-arm tool 14. The actuator 44 and the encoder 46 are in communication with the first controller 28. The first controller 28 controls the rotation of the trunnion 42 in conjunction with controlling movement of the first robot arm 12 when moving the primary part 20 to the interfacing position.

A force gauge 36 is mounted on the second robot arm 16 and is adapted to measure forces placed on the secondary component 22 by the second robot arm 16. The second controller 30 monitors the forces measured by the force gauge 36 as the secondary component 22 is brought into engagement with the primary component 20 to determine when the second component 22 contacts the primary component 20. Once the primary component 20 and the secondary component 22 are in contact, the second controller 30 continues to monitor the forces measured by the force gauge 36, and thus, the force exerted between the primary and secondary components 28, 30.

The first and second robot arms 12, 16 are adapted to be controlled by the first and second controllers 28, 30 based either on position control or force control. When the system controllers 28, 30 use position control, the first and second robot arms 12, 16 are controlled based on the three-dimensional position of the first and second robot arms 12, 16 within the work space of the component assembly system 10. When using position control, the first and second robot arms 12, 16 are controlled to keep them in a specific position. When the system controllers 28, 30 use force control, the first and second robot arms 12, 16 are controlled based on the force feedback measured by the force gauge 36.

The first and second controllers 28, 30 can be controlled using force control, wherein once the primary component 20 and the secondary component 22 are in contact, the first and second controllers 28, 30 will use feedback from the force gauge 36 to maintain contact between the primary and secondary components 20, 22 at a pre-determined force. The first and second controllers 28, 30 can also vary the force measured between the primary and secondary components 20, 22 based on a pre-determined force schedule.

Additionally, it may be desirable to induce a pre-load between the primary and secondary components 20, 22 to counter anticipated thermal distortion during welding or to react to thermal distortion that is detected during welding. Welding of the primary and secondary components 20, 22 will create thermal expansion and deformation of the primary and secondary components 20, 22. In order to counter this, the first and second robot arms 12, 16 can exert additional forces between primary and secondary components 20, 22 before welding begins. For example, it may be desirable to induce a pre-load or bend in the pre-assembled primary and secondary components 20, 22 before welding. A bend without plastic deformation will induce a pre-load in the finished component. When the weld is complete the orientation and position of the secondary component 22 on the primary component 20 will react in a predictable manner to the newly formed weld between the primary and secondary components 20, 22.

A joining robot arm 38 includes a joining tool 40 mounted thereon. The joining tool 40 is adapted to join the primary and secondary components 20, 22. The joining robot arm 38 is controlled to bring the joining tool 40 into engagement with the primary and secondary components 20, 22. The joining robot arm 38 may be a programmable mechanical arm, may include hand, wrist, elbow, and shoulder portions (not shown), and may be remotely-controlled by pneumatics and/or electronics. The joining robot arm 38 may be, as non-limiting examples, a six-axis articulated robot arm, a Cartesian robot arm, a spherical or polar robot arm, a selective compliance assembly robot arm, and the like. In one non-limiting example, the joining robot arm 38 may be a six-axis articulated robot arm.

It should be understood that the joining tool 40 can be any type of joining tool appropriate for joining subcomponents of different materials and characteristics. In the exemplary embodiment shown in FIG. 1, the joining tool 40 is a welding tool adapted to create a welded attachment of the primary and secondary components 20, 22.

Figure 2:
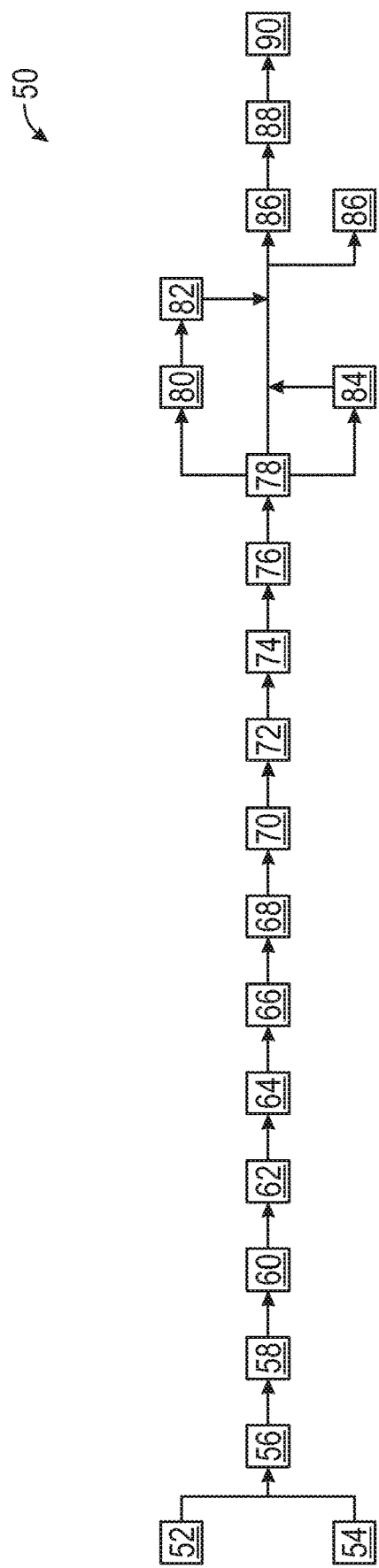
FIG. 2 is a schematic flowchart of a method of assembling a secondary component to a primary component according to an exemplary embodiment.

Referring to FIG. 2, a method of assembling a component is shown generally at 50. A method of assembling a primary component 20 and a secondary component 22 with the component assembly system 10 includes grasping 52 the primary component 20 with the first end-of-arm tool 14, grasping 54 the secondary component 22 with the second end-of-arm tool 18. After grasping 52 the primary and secondary components 20, 22 the primary and secondary components 20, 22 are positioned relative to one another within the workspace of the component assembly system 10.

The position of the primary component 20 is determined by visually inspecting 56 the primary component 20 with the camera 24 mounted onto the second robot arm 16. The camera 24 locates 58 datum features 26 on the primary component 20. The second controller 30 compares 60 the location of the datum features 26 on the primary component 20 to a reference coordinate frame located in the memory of the second controller 30.

After comparing 60 the actual position of the primary component 20 to the reference coordinate frame, the second controller 30 calculates 62 an off-set between the location of the datum features 26 of the primary component 20, as measured by the camera 24, and the reference coordinate frame. The off-set is then registered 64 in the second controller 30 and sent 66 to the first controller 28 through the robot-to-robot communication architecture.

The first controller 28 takes the off-set information from the second controller 30 and creates 68 a coordinate frame and moves 70 the primary component 20 to an interfacing position. The first robot arm 12 moves the first end-of-arm tool 14 and the trunnion 42 moves the primary component 20 relative to the first end-of-arm tool 14 to move the primary component to the interfacing position. At the interfacing position, interfacing surfaces 34 on the primary component 20 are presented at a proper position and orientation for the secondary component 22 to be attached thereto.

After the primary component 20 is moved, the first controller 28 sends the newly created coordinate frame and the position of the datum features 26 to the second controller 30. The second controller 30 uses the information of the new position of the primary component 20 to move 78 the secondary component 22 and bring the secondary component 22 into engagement with the primary component 20.

Simultaneously, as the second robot arm 16 and the second end-of-arm tool 18 moves the secondary component 22 into engagement with the interface surfaces 34 of the primary component 20, the second controller 30 monitors 84 forces measured by the force gauge 36 mounted on the second robot arm 16. By monitoring 84 the forces measured by the force gauge 36, the second controller 30 can detect exactly when the secondary component 22 makes contact with the primary component 20.

Once the primary and secondary components 20, 22 have been brought into contact with one another, the joining tool 40 mounted onto the joining robot arm 38 forms 86 a joint between the primary and secondary components 20, 22. It may be desirable to induce a pre-load between the primary and secondary components 20, 22 to counter anticipated thermal distortion during welding. Welding of the secondary component 22 to the primary component 20 will create thermal expansion and deformation of the primary and secondary components 20, 22. In order to counter this, the first and second robot arms 12, 16 can exert additional forces onto the primary and secondary components 20, 22 before welding begins. By way of a non-limiting example, it may be desirable to induce a pre-load or bend in the secondary component 22 before welding. A bend without plastic deformation will induce a pre-load. When the weld is complete the welded secondary component will react in a predictable manner to the newly formed weld to the primary component 20.

Simultaneously, as the joint is being formed 86 between the primary component and the secondary component, the forces between the primary and secondary components 20, 22 are continuously monitored 88 and varied 90 by the second controller 30. The force measured between the primary component 20 and the secondary component 22 may be varied based on a pre-determined force schedule. Alternatively, the force measured between the primary component 20 and the secondary component 22 may be varied in reaction to thermal distortion that is detected between the primary component 20 and secondary component 22 during joining.

The process described above can be repeated for any number of secondary components 22, or for multiple different subcomponents 22 to create a primary component 20 that has a plurality of various subcomponents 22 attached thereto.

A component assembly system 10 of the present disclosure offers several advantages. Components can be assembled without using a dedicated fixture. Additionally, components can be influenced by external forces prior to and during the welding process to create predictable thermal deformation and material characteristics. Finally, the component assembly system 10 of the present disclosure can perform as discussed above and is flexible to accommodate different types of secondary components and to vary the characteristics of the components formed therein.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of assembling a secondary component to a primary component, the method comprising:
    grasping a primary component with a first end-of-arm tool, wherein the first end-of-arm tool is attached to a first robot arm;
    grasping a secondary component with a second end-of-arm tool, wherein the second end-of-arm tool is attached to a second robot arm;
    visually inspecting the primary component with a camera mounted on the second end-of-arm tool;
    locating at least one datum feature on the primary component;
    comparing the location of the at least one datum feature of the primary component, as measured by the camera, to a reference coordinate frame stored in a second controller, wherein the second controller is adapted to control movements of the second robot arm and second end-of-arm tool;
    calculating an off-set between the location of the at least one datum feature of the primary component, as measured by the camera, and the reference coordinate frame;
    registering the off-set information in the second controller;
    sending the off-set information stored in the second controller to a first controller over a robot-to-robot communication architecture; wherein the first controller is adapted to control movements of the first robot arm and first end-of-arm tool;
    creating a coordinate frame in the first controller based on the off-set information received from the second controller;
    moving the primary component to an interfacing position, wherein interfacing surfaces on the primary component are presented at a proper position and orientation for the secondary component to be attached thereto;
    sending the created coordinate frame, including the position of the at least one datum feature after moving the primary component, from the first controller to the second controller;
    using the created coordinate frame and the position of the at least one datum feature to identify the location of the interface surface for the secondary component on the primary component relative to the at least one datum feature based on the created coordinate frame; and
    moving the second end-of-arm tool to bring the secondary component into engagement with the interface surfaces of the primary component.

2. The method of claim 1, further comprising, forming a joint between the primary component and the secondary component with a joining tool attached to a joining robot arm.

3. The method of claim 2, wherein forming a joint between the primary component and the secondary component with a joining tool attached to a joining robot arm further comprises:
    welding the secondary component to the primary component with a welding tool attached to the joining robot arm.

4. The method of claim 1, further comprising:
    simultaneously with moving the second end-of-arm tool to bring the secondary component into engagement with the interface surfaces of the primary component;
    monitoring forces measured by a force gauge mounted on the second robot arm, wherein the force gauge is adapted to measure forces being placed onto the secondary component by the second robot arm and second end-of arm tool to determine when there is contact between the primary and secondary components and to measure the force that the secondary component is being held in contact with the primary component.

5. The method of claim 4, further comprising:
    simultaneously with forming a joint between the primary component and the secondary component with a joining tool attached to a joining robot arm;
    continuously monitoring forces measured by the force gauge mounted on the second robot arm; and
    varying the position between the primary component and the secondary component to achieve a pre-determined force schedule.

6. The method of claim 4, further comprising:
    simultaneously with forming a joint between the primary component and the secondary component with a joining tool attached to a joining robot arm;
    continuously monitoring forces measured by the force gauge mounted on the second robot arm to detect thermal distortion between the primary component and secondary component; and
    varying the position and force applied between the primary component and the secondary component in reaction to thermal distortion between the primary component and secondary component.

7. The method of claim 1, wherein moving the primary component to an interfacing position, wherein interfacing surfaces on the primary component are presented at a proper position and orientation for the secondary component to be attached thereto further comprises:
    moving the first robot arm and first end-of-arm tool, and simultaneously, moving the primary component with respect to the first end of arm tool, to move the primary component to an interfacing position, wherein interfacing surfaces on the primary component are presented at a proper position and orientation for the secondary component to be attached thereto.

8. The method of claim 7, wherein moving the primary component with respect to the first end of arm tool, further comprises:
    articulating a trunnion mounted on the first end-of-arm tool, wherein the trunnion supports the primary component within the first end-of-arm tool and is moveable with a single degree of freedom to rotate the primary component relative to the first end-of-arm tool.

9. The method of claim 1, wherein visually inspecting the primary component further comprises:
    visually inspecting the primary component with a camera mounted on the second end-of-arm tool.

10. The method of claim 1, wherein visually inspecting the primary component further comprises:
    visually inspecting the primary component with a camera mounted at a fixed location.

11. A component assembly system comprising:
    a first end-of-arm tool mounted onto a first robot arm, wherein the first end-of-arm tool is adapted to grasp a primary component;
    a second end-of-arm tool mounted onto a second robot arm, wherein the second end-of-arm tool is adapted to grasp a secondary component;
    a non-contact inspection device adapted to visually inspect the primary component and locate datum features on the primary component;
    a first controller adapted to control movements of the first robot arm;

a second controller adapted to control movements of the second robot arm and to compare the location of the datum features of the primary component, as measured by the inspection device, to a reference coordinate frame stored in the second controller, wherein the second controller is further adapted to calculate an off-set between the location of the datum features of the primary component, as measured by the camera, and the reference coordinate frame, and to register the off-set information in the second controller;

a robot-to-robot communication architecture interconnecting the first controller and the second controller, wherein the second controller sends the off-set information to the first controller over the robot-to-robot communication architecture, wherein the first controller is adapted to create a coordinate frame based on the off-set information received from the second controller and move the primary component to an interfacing position, wherein interfacing surfaces on the primary component are presented at a proper position and orientation for the secondary component to be attached thereto; and a force gauge mounted onto the second end-of-arm tool, wherein the force gauge is adapted to measure reaction forces in the interface surfaces when there is contact between the primary and secondary components.

12. The component assembly system of claim 11, further comprising:

a joining tool mounted onto a joining robot arm, wherein the joining tool is adapted to form a joint between the primary component and the secondary component.

13. The component assembly system of claim 12, wherein the joining tool is a welding tool adapted to weld the secondary component to the primary component.

14. The component assembly system of claim 11, wherein the second controller is adapted to vary the reaction force measured between the primary component and the secondary component based on a pre-determined force schedule.

15. The component assembly system of claim 11, wherein the second controller is adapted to vary the reaction force measured between the primary component and the secondary component in reaction to thermal distortion between the primary component and secondary component.

16. The component assembly system of claim 11, further comprising:

a trunnion mounted on the first end-of-arm tool, the trunnion adapted to support the primary component on the first end-of-arm tool and rotatable about an axis to enable the primary component to rotate relative to the first end-of-arm tool.

17. The component assembly system of claim 16, further comprising:

an actuator mounted on the first end-of-arm tool adapted to rotate the trunnion relative to the first end-of-arm tool, and an encoder attached to the trunnion adapted to measure the angular position of the trunnion relative to the first end-of-arm tool, wherein the actuator and the encoder are in communication with the first controller and the first controller controls the rotation of the trunnion in conjunction with controlling movement of the first robot arm when moving the primary part to the interfacing position.

18. The component assembly system of claim 11, wherein the non-contact inspection device is a camera mounted at a fixed position.

19. The component assembly system of claim 11, wherein the non-contact inspection device is a camera mounted on the second end-of-arm tool.

20. The component assembly system of claim 11, wherein the first and second robot arms are six-axis articulated robot arms.

* * * * *